United States Patent [19]

Row

[11] Patent Number: 4,779,571
[45] Date of Patent: Oct. 25, 1988

[54] POULTRY WATERING SYSTEM

[76] Inventor: Scott W. Row, 4599 Bogie Rd., Duluth, Ga. 30136

[21] Appl. No.: 882,388

[22] Filed: Jul. 7, 1986

[51] Int. Cl.⁴ .............................................. A01K 7/00
[52] U.S. Cl. .................................. 119/75; 119/97 AR
[58] Field of Search ................... 119/75, 97, 51.5, 72, 119/72.5

[56] References Cited

U.S. PATENT DOCUMENTS

| | | |
|---|---|---|
| 2,626,724 | 1/1953 | Smallegan . |
| 2,723,648 | 11/1955 | Logan . |
| 2,988,048 | 6/1961 | Zimmerman . |
| 3,241,526 | 3/1966 | Essink . |
| 3,298,356 | 1/1967 | Sutton . |
| 3,513,811 | 5/1970 | Graham . |
| 3,664,305 | 5/1972 | Hart . |
| 3,724,425 | 4/1973 | Thompson ............................ 119/72 |
| 3,887,165 | 6/1975 | Thompson . |
| 3,941,094 | 3/1976 | Nilsen . |
| 3,960,350 | 6/1976 | Tardoskegyi . |
| 4,133,345 | 1/1979 | Mitchell . |
| 4,267,800 | 5/1981 | Keller . |
| 4,282,831 | 8/1981 | Nilsen ................................. 119/75 |
| 4,284,036 | 8/1981 | Hostetter . |
| 4,341,182 | 7/1982 | Rustin ................................. 119/75 |
| 4,394,847 | 7/1983 | Langenegger et al. ............... 119/75 |
| 4,402,343 | 9/1983 | Thompson .......................... 119/75 |

Primary Examiner—Carl D. Friedman
Assistant Examiner—Caroline D. Dennison
Attorney, Agent, or Firm—Jones, Askew & Lunsford

[57] ABSTRACT

A novel poultry watering apparatus including a central support member suspended from a ceiling, from which watering apparatus including a feed pipe and a plurality of poultry watering cups is in turn suspended. Anti-roost apparatus is supported on a plurality of vertical stanchions extending above the central support member. An improved valve structure having an anti-clogging device disposed at the inlet opening thereto is also disclosed. The anti-clogging apparatus comprises a pin extending through the inlet opening having a diameter less that that of the opening, and which is spring-biased in a downward position. When the valve is opened by the poultry, water pressure from the feed pipe overcomes the spring pressure and allows water to flow through the opening. The flow of water agitates within the opening, thereby preventing accumulation of debris within the opening. A novel unitary structure, preferably made of plastic, for the poultry watering cup is disclosed. A threaded insert portion of the valve assembly mated directly with a threaded portion of a unitary plastic cup wherein the analogous structure was threaded into a seocnd separate structure in the prior art.

13 Claims, 4 Drawing Sheets

POULTRY WATERING SYSTEM

FIELD OF THE INVENTION

The present invention relates to watering systems for fowl or other small animals, and more particularly, to a watering system which discourages fowl roosting above the drinking area. The present system also resists clogging due to water contamination, and may be used throughout various stages of fowl growth.

BACKGROUND OF THE INVENTION

In raising chickens, turkeys, or other fowl, it is desirable to provide a system for supplying the fowl with an adequate supply of fresh drinking water. The system must be simple in operation, due to the limited intelligence of the fowl, and also must not allow the water to become contaminated prior to consumption by the fowl. Furthermore, the systems must not allow water to leak and contaminate the fowl's living areas, which could endanger the fowl's health. The system must also be adaptable for use during various stages of fowl growth.

One prior art method of providing water to such fowl is to provide an open-topped trough container with automatic water level control which allows the fowl to drink the water from the trough. However, several problems have been encountered with such systems. A primary problem is that such configurations are easily contaminated as their open-topped nature readily captures feathers, droppings, etc., falling from above the trough area. Furthermore, such systems pose a danger of small fowl entering the trough cavity and drowning. The open nature of the watering system also allows much of the water to be lost through evaporation. One example of such trough systems is disclosed in U.S. Pat. No. 2,626,724 to Smallegan, which discloses a method for connecting and suspending V-shaped sections such that water is contained in such sections for fowl consumption. U.S. Pat. No. 3,298,356 to Sutton discloses a trough-type system having a series of water-blocking gates which allow individual sections to be cleaned without emptying the entire system. U.S. Pat. No. 2,988,046, to Zimmerman discloses a trough-type poultry waterer with vertically adjustable troughs to accommodate various fowl sizes.

Other prior art systems have provided "nibbler valves" which allow the fowl to activate a water valve when water is desired. One example of such valve is U.S. Pat. No. 4,341,182 to Rustin, which discloses a nibbler valve having a threaded exterior which treadably engages a hole in a water supply conduit. As the nibbler valve is activated by the beak of the animal, water is released through the valve. Rustin also discloses an upwardly facing watertight drinking cup surrounding the valve, which accepts and contains the released from the valve. After activating the valve and depositing a portion of water in the cup, the fowl may consume the water from the cup until the cup is empty. The fowl may reactivate the valve if additional water is desired. Although such valves are effective in most applications, difficulties often arise when the valves are used with water having a high mineral or chemical content, as impurities or additives in the water tend to jam or clog the valves. This is disadvantageous in that the valve may provide an inadequate supply of water if the valves are restricted or clogged, or, conversely, the valves may flood the living area of the fowl if jammed in an open position.

Further disadvantages exist when using a valve-cup assembly. As shown in U.S. Pat. No. 4,341,182 to Rustin, the valves are conventionally of a metallic structure, and threadably engage a hole provided in the water supply conduit, which is often composed of a plastic. When field replacement of a valve is required, this threaded connection is often mismatched during insertion of the valve into the conduit, and the plastic threads are often cross-threaded. This can result in a leaky connection between the valve and the conduit, which again may result in flooding of the fowl living area.

Another problem encountered with conventional fowl watering systems is that fowl have a tendency to perch atop the highest roosting position they can obtain. This position is often atop the watering system, which is disadvantageous in that the fowl tend to foul the watering system with droppings, etc. Therefore it has been known to provide a "shock wire" where the fowl tend to perch, to discourage roosting in that area. However, this can be traumatic to the fowl, and can even result in death if the shock is too intense.

Therefore there is a need for an improved fowl watering system which includes a water supply valve which is simple in design, easily installed or replaced, and is resistant to clogging due to impurities in the water supply. There is also a need for an improved fowl watering system which prevents fowl from roosting on top of the system.

SUMMARY OF THE INVENTION

The present invention solves problems in the prior art by providing an improved anti-roosting configuration which includes a pivoting member located atop the fowl watering system, which becomes unstable when perched upon by a fowl. The present invention also provides a one-piece valve-cup body which may be assembled under controlled conditions, obviating many field installation errors. Also provided is an inlet cleaning member which periodically cleans the inlet passage of the valve, thus preventing a buildup of contamination in the inlet passage.

The device in general includes a support assembly for supporting a water supply pipe for a poultry watering system, comprising in combination at least two main support brackets, a central elongate support member extending between the support brackets, and at least two spaced-apart pipe brackets connected to the support member for holding the water pipe below the support member.

The device also includes a water dispensing device for animals, comprising a housing having a chamber, the chamber having inlet and outlet passage openings; a valve for controlling water flow through the inlet and outlet passages; and an inlet passage cleaning means which comprises an elongated stem extending through the inlet passage; and a stem agitation means operably associated with the stem for agitating the stem relative to the inlet passage in response to water flow through the inlet passage.

Stated somewhat more particularly, the elongate stem, of the water dispensing device extends through the inlet passage but does not seal the inlet passage.

The device also includes a one-piece cup and valve body for use in a poultry watering apparatus comprising: a cup having a interior floor portion and an interior wall portion, and a cup supply port in the interior floor portion; a chamber below the floor portion of sufficient cross sectional area for slidably engaging a valve sealing member of a characteristic predetermined cross sectional area; a connecting passage between the cup supply port and the chamber for establishing fluid passage therebetween, the connecting passage being of cross sectional area less than the characteristic cross-sectional area; an inlet opening at the bottom of the chamber, the inlet opening being at least of the characteristic cross sectional area; and water supply engaging means for connecting the inlet opening to a source of water.

Stated somewhat more particularly, the interior floor portion of the one-piece cup and valve body includes a base portion and a raised portion, the raised portion being surrounded by the base portion and defining the cup supply port.

OBJECTS OF THE INVENTION

It is an object of the present invention to provide an improved water supply system for fowl.

It is another object of the present invention to provide a system of this character which is resistant to contamination.

It is a further object of the present invention to provide a system of this character which is inexpensive, efficient, and easily serviced.

Other objects, features and advantages of the present invention will become apparent upon reading the following detailed description of the preferred embodiment of the invention, when taken in conjunction with the drawings and the appended claims.

DETAILED DESCRIPTION OF THE PREFERRED EMBODIMENTS

Figure 1:
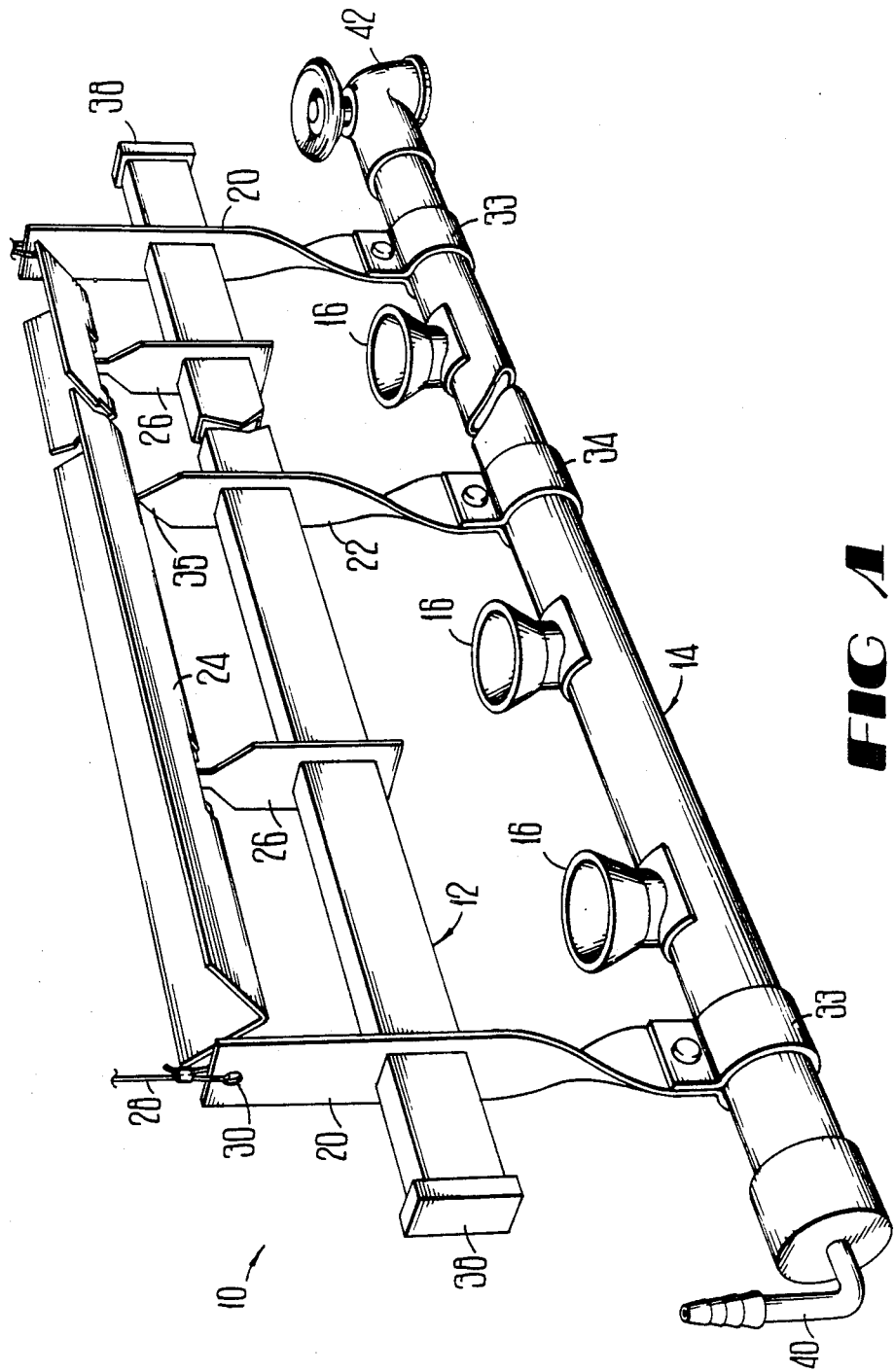
FIG. 1 is a fragmentary pictorial view of a poultry water supply system according to a preferred embodiment of the present invention.

Referring now in greater detail to the drawings in which like numerals indicate like parts throughout the several views, FIG. 1 shows a poultry watering system 10 according to the present invention. The watering system 10 includes a tubular central support member 12, a tubular water manifold 14, interchangeable drinking cup assemblies 16, interchangeable end support brackets 20, interchangeable inner support brackets 22, an anti-roost channel 24, interchangeable anti-roost channel support brackets 26, and suspension wires 28.

Central support member 12 is elongate and has a generally rectangular outer cross section. The central support member 12 of the preferred embodiment is hollow, although a solid configuration may be used without departing from the spirit and scope of the invention. The water manifold 14 is tubular, and has a generally O-shaped cross section. The anti-roost channel is elongate and has a generally V-shaped cross section. The end brackets 20 are elongate and have a generally rectangular cross section with the two longer opposing sides of the cross section being substantially longer than the two shorter opposing sides. Each of the upper ends of the end support brackets 20 define a suspension wire hole 30. A rectangular hole is provided in approximately the center of each of the end support brackets 20, which accepts the rectangular outer cross section of the central support member 12 as described later in this specification. Each of the end support brackets 20 is twisted 90° below the rectangular hole such that the primary planar surfaces of the upper portion of the end support brackets are perpendicular to the primary planar surfaces of the lower portion of the end support brackets. The extreme lower ends of the end support brackets 20 are doubled back to form a water manifold mount 33 to accept and support the water manifold 14 as described later in this specification.

The inner support brackets 22 are similar to the end support brackets 20, each defining a similar rectangular hole, having a 90° twist, and having water manifold mounts 34. However, the upper portion of the inner support brackets does not define a suspension wire hole, but instead tapers to a point 35.

The anti-roost channel support brackets 26 each have a transverse cross section similar to the end support brackets 20. The lower portion of each of the anti-roost support brackets 26 defines a rectangular hole similar to that previously described in the end support brackets 20, which similarly accepts the rectangular outer cross section of the central support member 12. The upper portion of the anti-roost support brackets 26 tapers to a tab which defines a pivot hole discussed in further detail later in this specification.

Interaction of the individual elements is now discussed. The water manifold 14 is suspended in a spaced-apart relationship below the central support member 12 by the end support brackets 20 and inner support brackets 22 such that the longitudinal axis of the central support member is substantially parallel to the longitudinal axis of the water manifold. The end support brackets 20 are attached at each end of the central support member 12 and at each end of the water manifold 14. The inner support brackets 22 are attached at various positions along the lengths of the central support member 12 and the water manifold 14. The rectangular hole of each of the end support brackets 20 and inner support members 22 slidably accepts the cross section of the central support member 12, such that the longitudinal axis of the central support member is substantially normal to the primary planar surfaces of the upper portion of the end support brackets and the inner support brackets. The end caps 38 slidably fit over each end of the central support member 12 to limit the longitudinal travel of the central support member relative to the end support brackets 20, and also to prevent contamination of the interior of the central support member by dust, dirt, etc.

The water manifold clamps 33, 34, of the end support members 20, and the inner support members 22, respectively, encircle and rigidly grasp water manifold 14.

The drinking cup assemblies 16 are positioned at various positions along the length of the water manifold 14, with the reservoir portion of the assemblies disposed in a generally upward position. The drinking cup assemblies 16 provide a supply of drinking water to the fowl in a manner discussed in further detail later in this specification.

Water is supplied to the water manifold 14 by an exterior water source (not shown) which introduces water into the water manifold through an inlet connector 40 attached to one end of the water manifold. An outlet valve 42 is attached at the other end of water manifold, to allow water to be drained from the water manifold.

Figure 2:
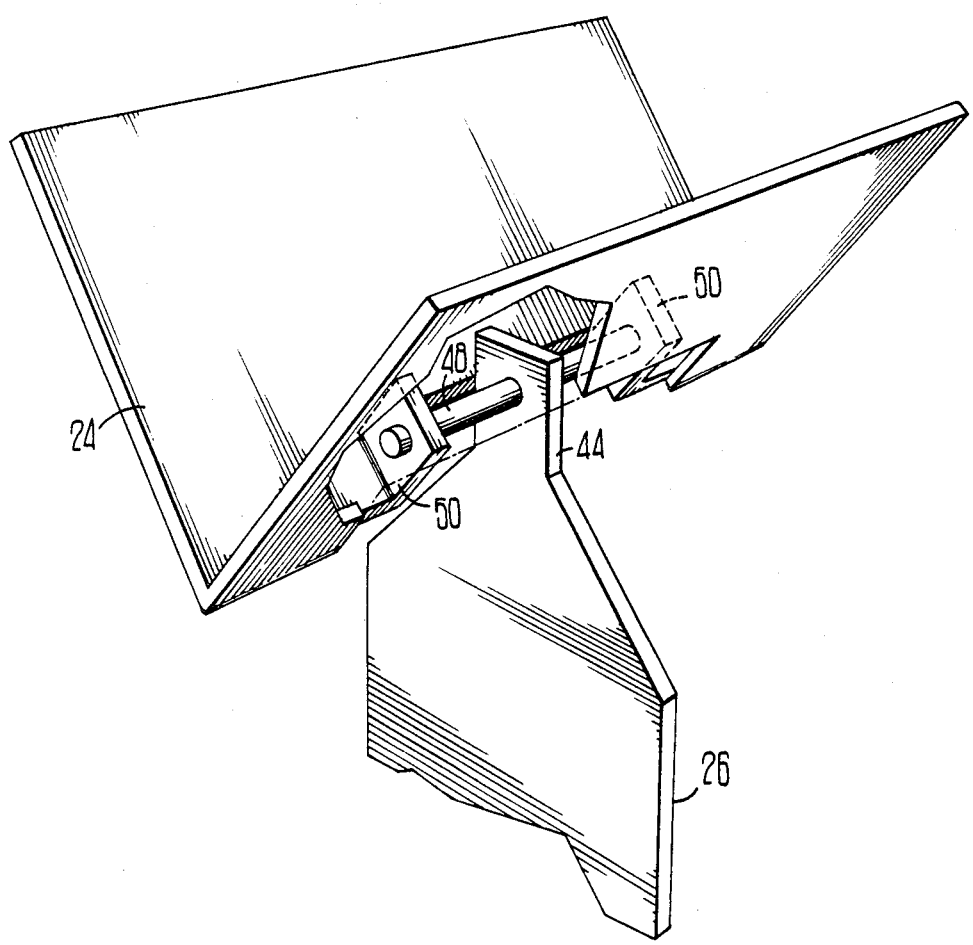
FIG. 2 is an enlarged fragmentary perspective of one end of the device of FIG. 1, which shows in detail the operable connection between the pivoting anti-roost member and one of its support brackets.

The anti-roost channel support brackets 26 pivotally support the anti-roost channel 24 above the central support member 12. The rectangular hole of the each of the anti-roost channel support brackets 26 slidably accepts the cross section of the central support member 12, such that the longitudinal axis of the central support member is substantially normal to the primary planar surfaces of the anti-roost channel support brackets 26. Referring now to FIG. 2, the upper end of each of the anti-support channel support brackets 26 defines a tab 44, which extends through a corresponding hole provided in the bottom of the anti-roost channel 24. Pivot pins 48 pass through flanges 50 extending from anti-roost channel 24, and also pass through the tabs 44 extending from anti-roost brackets, such that the anti-roost channel pivots relative to the anti-roost channel brackets about the longitudinal axis of the pivot pins.

Referring now to FIG. 1, the suspension wires 28 have one end attached to the end support bracket 20 through a suspension wire hole 30, extend upwardly, and have the other end attached to a take-up reel (not shown). As previously discussed, the end support brackets 20 connect and support the central support member 12 and the water manifold 14. Furthermore, the anti-roost channel 24 is supported above the central support member 12 by the anti-roost channel support brackets 26. Therefore it may be seen that the entire poultry watering system 10 is suspended by the suspension wires 28.

Operation of the poultry watering system 10 is now discussed. Referring to FIG. 1, water is introduced into the water manifold 14 through the inlet connector 40 from an exterior water supply (not shown), while the outlet valve 42 is in a closed position. A fowl-activated valve configuration in the drinking cup assemblies 16 allows the fowl to drink from the drinking cup assemblies in a manner discussed in greater detail further in this specification.

If it is desired to purge the water in the system with fresh water, outlet valve 42 may be opened while still providing water to the system from the exterior water source through inlet connector 40. If it is desired to drain water in the system, the supply of water from the exterior water supply is terminated, and the outlet valve 42 is then opened to allow water to drain by gravity.

Figure 3:
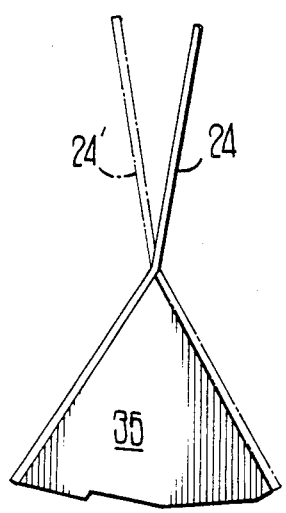
FIG. 3 is a diagrammatic representation of the pivoting action of the anti-roost channel and its support brackets.

Should the fowl desire to roost on the poultry watering system 10, the natural position for roosting is the uppermost member of the system, which is the anti-roosting member 24. Referring now to FIGS. 1, 2, and particularly FIG. 3, the normal resting position of the anti-roosting device 24 is not as shown in FIGS. 1 or 2, but instead is one of the two resting positions shown in FIG. 3 as 24 or 24'. The tapered configuration of the upper portions of the inner support brackets 26 and the anti-roost channel support brackets 26 serves to limit the pivoting travel of the anti-roost channel 24 such that no stable roosting area is available on the anti-roosting channel. If a fowl attempts to perch atop the anti-roost channel 24, the channel becomes unstable, "flips" over to its alternate position 24' under the fowl's weight, and the fowl falls off unharmed. If roosting is again attempted, the anti-roost channel 24 flips back to its previous position. This prevents the fowl from roosting above the drinking area and contaminating the drinking area with droppings, feathers, etc.

The entire poultry watering system may be raised or lowered by activating the take-up reels (not shown) which retract or extend the suspension wires 28 from above the poultry watering device. This allows positioning of the drinking cup assemblies 16 at an optimum drinking height throughout the growth period of the fowl.

Figure 4:
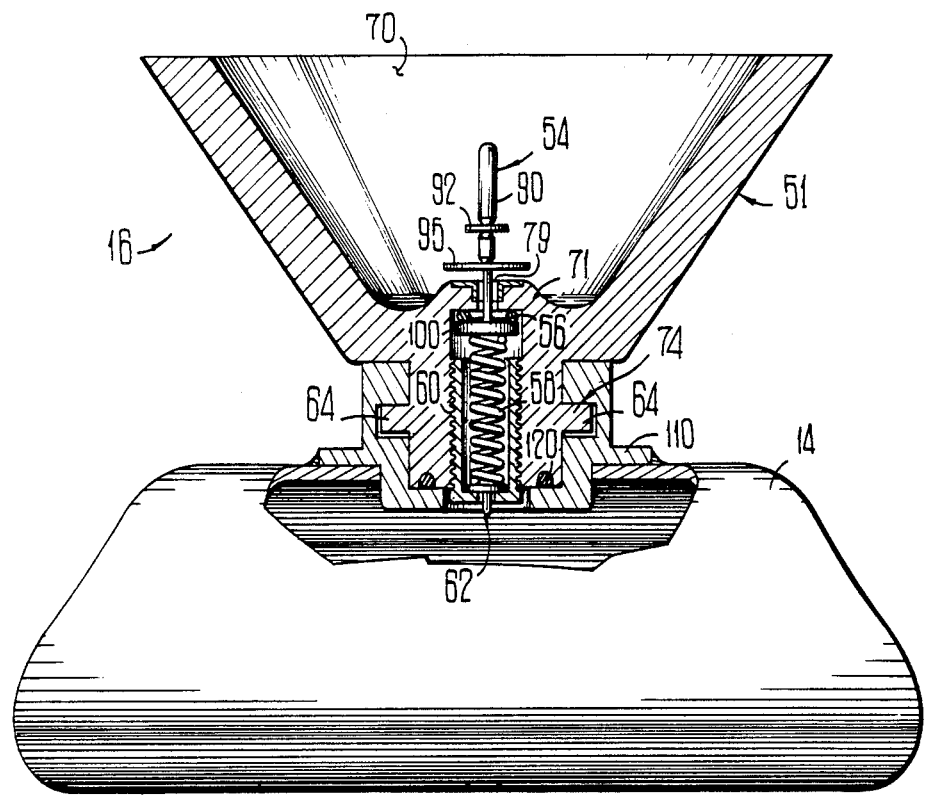
FIG. 4 is an enlarged side cutaway of one of the drinking cup assemblies, showing the drinking cup assembly mounted on the tubular water supply manifold, shown in partial cutaway.

Detailed discussion of one of the drinking cup assemblies 16 now follows. Referring now to FIG. 4, each of the drinking cup assembly 16 includes a body 51, a valve member 54, an O-ring 56, an internal compression spring 58, a threaded insert cup 60, an inlet cleaning member 62, and locking pins 64.

The body 51 of the drinking cup assembly 16 defines an upwardly facing cup portion 70 and a base portion 74 underneath the cup portion 70. The floor of the cup portion has a raised central plateau portion 71 which defines a cup supply hole fed from a connecting passage 79 discussed in further detail later in this specification.

Figure 5:
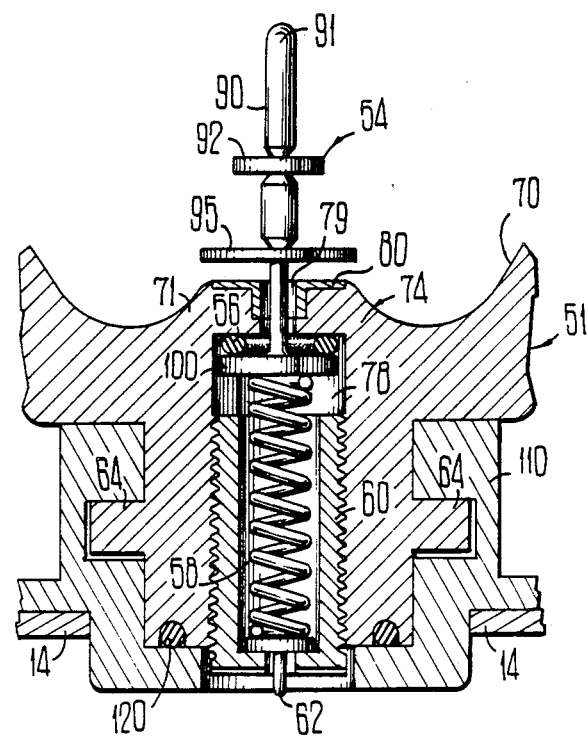
FIG. 5 is an enlarged view of the drinking cup assembly of FIG. 4.

Referring now to FIG. 5, the base portion 74 defines an cylindrical inside chamber 78 having a substantially vertical longitudinal axis, and also defines a connecting passage 79 which allows for fluid commutation between the inside chamber and the cup portion 70. A bearing insert 80 is provided at the upper opening of the connecting passage 79.

Locking pins 64 have substantially common longitudinal axes and extend radially outward from the base portion 74. The inlet end of cylindrical chamber 78, being at the lower end of the cylindrical chamber, has substantially the same lateral cross section as cylindrical chamber 78. The cylindrical walls of the cylindrical chamber 78 are threaded to threadably engage threaded insert cup 60, as discussed in further detail later in this specification.

Valve member 54 includes a stem 90 having a pecking tip 91, a pecking disc 92, a water deflection disc 95, and a sealing member 100. Pecking stem 90 is rigidly affixed to sealing member 100. Pecking disc 92 and deflection disc 95 each have a center hole having a cross section approximate to the outer cross section of stem 90.

Threaded insert cup 60 is tubular, has an O-shaped cross section, and has a circular bottom cap defining an inlet opening positioned at approximately the center of the bottom cap. The outside cylindrical walls of the insert cup 60 have an outer cross section approximate to cross section of the cylindrical chamber 78, and are threaded to threadably engage the walls of the cylindrical chamber.

Assembly of the individual elements of the drinking cup assembly 16 is now discussed. Referring now to FIGS. 4 and 5, O-ring 56 is positioned adjacent to the upper end of the cylindrical chamber 78 such that the O-ring encircles the opening in the chamber which leads to the connecting passage 79. The pecking tip 91 of valve member 54 is then passed through the connecting passage 79 such that the pecking tip protrudes within the cup portion 70, and the sealing member 100 contacts O-ring 56. Water deflection disc 95 and pecking disc 92 are threaded upon the stem 91 of valve member 54, and snap-fitted into position along the length of the stem.

Inlet cleaning member 62 is inserted into insert cup 60 such that the pin of the inlet cleaning member passes through the hole in the bottom of the insert cup. Compression spring 58 is then positioned inside insert cup 60 such that the lower end of the compression spring rests upon the upper surface of the inlet cleaning member 62, and the compression spring is partially enclosed by the cylindrical walls of the insert cup.

Figure 6:
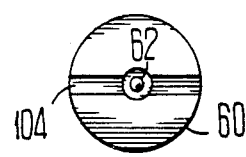
FIG. 6 is an isolated bottom plan view of the threaded insert cup of the valve of FIG. 5.

The insert cup 60 is then brought into threaded engagement with the cylindrical cavity 78 inside the drinking cup body 51, with the threaded exterior walls of the insert cup threadably engaging the threaded interior walls of the cylindrical cavity. As shown in FIG. 6, the lower end of insert cup 60 defines a slot 104 to allow installation and removal of the insert cup by a conventional flat screwdriver or other similar tool. Referring now to FIGS. 4 and 5, as the insert cup is threaded into the cylindrical cavity 78, the upper end of compression spring 58 is brought into contact with the lower surface of the sealing member. When the insert cup 60 is fully inserted, the compression spring 58 is compressed between the sealing member 100 and the inlet cleaning member 62. The compressive force of the compression spring 58 is sufficient to maintain the sealing member 100 in biased contact with the O-ring 56, and to maintain the O-ring in biased contact with the upper end of the chamber 78. This normally closed position of the sealing member 100 maintains a watertight seal between the chamber 78 and the connecting passage 79. The lower end of the compression spring 58 maintains the disc portion of the inlet cleaning member in contact with the bottom of the insert cup 60, and positions the stem of the inlet cleaning member 62 in the inlet hole of the insert cup.

Figure 7:
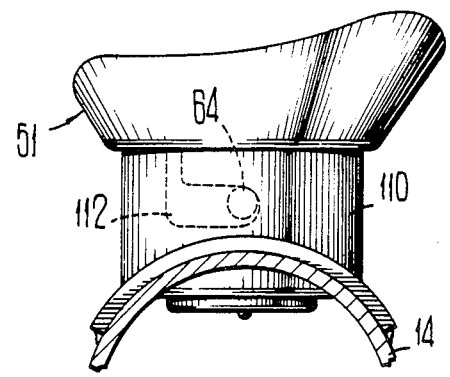
FIG. 7 is an isolated side cutaway view along line 7—7 of FIG. 4, with the locking pin-slot configuration shown in phantom.

Referring now to FIG. 7, the base portion 51 of the assembled drinking cup assembly 16 is then inserted into a seat 110 protruding from the water manifold 14. The locking pins 64 are matingly accepted by slots 112 defined by seat 110. An O-ring 120 is provided at the contacting surfaces of the base portion 51 and the seat 110, to provide a waterproof seal between the base portion and the seat.

Operation of the of the drinking cup assembly 16 is now discussed. Water is introduced into the water manifold 14 under sufficient pressure to overcome the spring pressure on the inlet cleaning member 62, thus allowing water to enter the cylindrical chamber 78.

As previously discussed, the sealing member 100 is in a normally closed position, as the compression spring 58 baises the sealing member against the O-ring 56, which in turn is biased against the top of the cylindrical chamber, and seals the connecting passage 79. When the sealing member 100 is in this position, a watertight seal exists between the sealing member and the upper end of the chamber 56, which prevents water from passing by the sealing member 100, and into the connecting passage 79.

When a fowl desires to consume water, it contacts the pecking tip 91 or the pecking disc 92 with its beak, snout, etc., with sufficient force to unseat the sealing member 100. It should be understood that the fowl does not not need to displace the valve member 54 longitudinally, but instead may displace the pecking tip 91 radially, effectively inducing the valve member to pivot on one side of the O-ring 56. If the valve member 54 pivots in such a manner, the sealing member 100 becomes unseated from the opposite side of the O-ring 56, and water passes between the O-ring and the sealing member, through the connecting passage 79, and upwardly into the cup portion 70. If the valve member is displaced radially, the entire sealing member 100 becomes unseated from the O-ring 56, and water similarly passes upwardly into the cup portion 70.

After a certain portion of water has entered the cup portion 70, the fowl ceases contact of the pecking tip 91 or pecking disc 92, and the valve member returns to its normally closed position. The fowl then consumes the water stored in the cup portion 70. Should the fowl desire additional water, it recontacts the valve member 54 as previously described, and an additional supply of water is provided to the cup portion 70.

As previously discussed, when the pressure differential between the water in the water manifold 14 and the water in the chamber 78 overcomes the spring pressure on the inlet cleaning member 62, the inlet cleaning member becomes unseated, thus allowing water to exit through the cylindrical chamber 78. Therefore it may be seen that the pin in the inlet cleaning member 62 moves up within the inlet port whenever the inlet cleaning member becomes unseated, and the pin moves down within the inlet port when the inlet cleaning member is reseated. This repetitive motion serves to maintain the inlet port free of contaminate accumulation.

Figure 8:
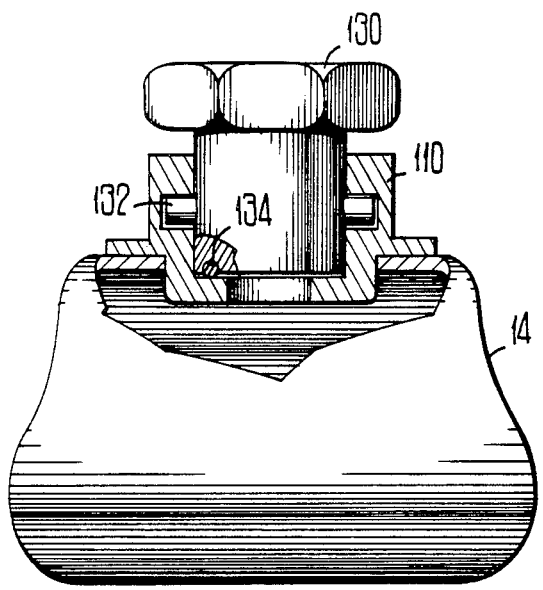
FIG. 8 is a side cutaway of a plug replacing the drinking cup assembly of FIG. 4, showing the plug mounted on the water supply manifold, shown in partial cutaway.
Figure 9:
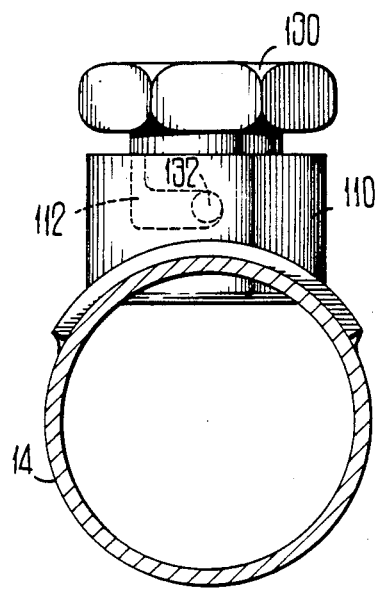
FIG. 9 is a side cutaway view of the plug along line 9—9 of FIG. 8, with the locking pin-slot configuration shown in phantom.

Referring now to FIGS. 8 and 9, a plug 130 may be interchanged with drinking cup assembly 16, if it is desired to lessen the amount of valves along the water manifold 14. The plug 130 defines includes two radially extending locking pins 132 which are matingly accepted by the slots 112 defined by the seat 110. An O-ring 134 is provided at the contacting surfaces of the base of the plug and the seat 110, to provide a waterproof seal between the plug and the seat.

While this invention has been described in specific detail with particular reference to the disclosed embodiments, it will be understood that many variations and modifications can be effected within the spirit and scope of the appended claims.

I claim:
1. A water dispensing device for animals, comprising:
 (A) a housing having a chamber, said chamber having inlet and outlet passage openings, and also defining an annular seat intermediate said inlet passage and said chamber; and
 (B) valve means for controlling water flow through said outlet passage; and
 (C) an inlet cleaning member comprising:
   (1) a stem member extending through said annular seat and said inlet passage, and
   (2) a head member affixed to said stem member;
 (D) spring biasing means for maintaining said head member against said annular seat of said inlet opening such that said inlet cleaning member is agitated responsive to a water pressure differential between fluid in said chamber and fluid in said inlet passage.

2. The water dispensing device as claimed in claim 1, wherein said stem member is rigidly attached to said head member.

3. The water dispensing device as claimed in claim 2, wherein said head member is substantially cylindrical, and has a first and a second circular end face; wherein said stem member extends away from said first face of said head member and along the longitudinal axis of said head member; and wherein said head member contacts said annular seat on said first of said head member.

4. The water dispensing device as claimed in claim 3, wherein the distance along said longitudinal axis of said head member is less than the diameter of said head member, and wherein said stem is elongate and cylindrical in shape and has a longitudinal axis substantially common to the longitudinal axis of said head.

5. A water dispensing device for animals, comprising:
(A) a housing having a chamber, said chamber having inlet and outlet passage openings, said housing defining a first annular seat intermediate said outlet passage and said chamber, and also defining a second annular seat intermediate said inlet passage and said chamber;
(B) a valve member comprising:
  (1) a valve member stem extending through said first annular seat and said outlet passage, and
  (2) a valve member head affixed to said stem member;
(C) an inlet cleaning member comprising:
  (1) an inlet cleaning member stem extending through said second annular seat and said inlet passage, and
  (2) an inlet cleaning member head affixed to said stem member;
(D) a compression spring having an upper end and a lower end, said upper end biasing against said valve member head such that said valve member head is biased against said first annular seat, said lower end of said spring biasing against said inlet cleaning member head such that said inlet cleaning member head is biased against said second annular seat, such that said inlet cleaning member is agitated relative to said second annular seat responsive to a water pressure differential between fluid in said chamber and fluid in said inlet passage when said valve member head is unseated from said first annular seat.

6. The water dispensing device as claimed in claim 5, wherein said valve member stem is rigidly attached to said valve member head; and
wherein said inlet cleaning member stem is rigidly attached to said inlet cleaning member head.

7. The water dispensing device as claimed in claim 6, wherein said valve member head is substantially cylindrical, and has a first and a second circular end face;
wherein said valve member stem extends away from said first face of said head member and along the longitudinal axis of said valve member head; a first and a second circular end face;
wherein said inlet cleaning member stem extends away from said first face of said inlet cleaning member head and along the longitudinal axis of said inletcleaning member head; and wherein said inlet cleaning member head contacts said second annular seat on said second face of said valve member head.

8. A cup and valve assembly for use in a poultry watering apparatus comprising:
(A) a body member defining:
  (1) a cup having an interior floor portion and an interior wall portion, and a cup supply port in said interior floor portion;
  (2) a cylindrical chamber below said floor portion having a first circular cross sectional area and being open at its lower end;
  (3) a connecting passage between said cup supply port and said chamber for establishing fluid passage therebetween, said connecting passage being of a second cross sectional area less than said first cross-sectional area;
  (4) a first annular seat intermediate said cylindrical chamber and said connecting passage;
  (5) a downwardly directed inlet opening at the bottom of said chamber, said inlet opening being at least of said first transverse cross sectional area; and
  (6) a second annular seat located about the exterior of said inlet opening of said body member;
(B) a valve member comprising:
  (1) a sealing member of a second transverse cross sectional area less than said said first transverse cross sectional area; and
  (2) an elongate stem affixed to and extending from said stem member,
  said sealing member positioned within said the upper end of said cylindrical chamber and adjacent said annular seat and said elongate stem extending through said connecting passage and protruding within said cup;
(C) an insert cup comprising;
  (1) a tubular portion having a substantially constant circular outer diameter and a substantially constant circular inner diameter, said outer diameter being approximate to the inner diameter of said cylindrical chamber, said tubular portion having an upper end and a lower end, said upper end defining a mouth; and
  (2) a floor portion in the lower end of said tubular portion, said floor portion defining a insert cup inlet opening,
  said insert cup adapted to be inserted into said lower end of said cylindrical chamber such that said tubular portion is at least partially concealed within said cylindrical chamber, and said mouth of said insert cup is directed upwardly toward said connecting passage;
(D) a compression spring having an upper and a lower end, said compression spring positioned within said cylindrical chamber and at least partially within said insert cup, said lower end biasing against said floor portion of said insert cup, and said upper end biasing against said sealing member such that said sealing member is biased against said annular seat and fluid flow may be restricted through said connecting passage;
(E) biasing means for biasing said said second annular seat of said body member against a corresponding seat positioned about an outlet port of a fluid supply source such that fluid may be directed under pressure to said insert cup inlet opening.

9. The assembly as claimed in claim 8, further comprising a fluid sealing o-ring positioned intermediate said second annular seat of said body member and said seat of said fluid supply source, and wherein said biasing means is a quick disconnect connection between said body member and said fluid supply source.

10. The assembly as claimed in claim 9, further comprising a bearing surface provided at least partially along said passageway, said bearing surface attached to said body member intermediate said passageway and said stem to reduce wear to said body member by said stem.

11. The assembly as claimed in claim 9, wherein said connecting passage is circular in cross section and wherein said elongate stem is circular in cross section.

12. The assembly as claimed in claim 8, wherein said connecting passage is circular in cross section and wherein said elongate stem is circular in cross section.

13. A cup and valve assembly for use in a poultry watering apparatus comprising:
(A) a body member defining:
 (1) a cup having an interior floor portion and an interior wall portion, and a cup supply port in said interior floor portion;
 (2) a cylindrical chamber having a longitudinal first axis below said floor portion, said chamber having a first circular transverse cross sectional area;
 (3) a connecting passage between said cup supply port and said chamber for establishing fluid passage therebetween, said connecting passage being of a circular second cross sectional area less than said first cross-sectional area and having a longitudinal axis substantially common to said first axis;
 (4) a first annular seat intermediate said cylindrical chamber and said connecting passage and encircling said first axis;
 (5) an inlet opening at the bottom of said chamber, said inlet opening being at least of said first cross sectional area;
(B) a valve member comprising:
 (1) a cylindrical sealing member having a longitudinal axis substantially common to said first axis; and
 (2) an elongate stem rigidly affixed to and extending from said stem member along said first axis, said sealing member positioned within the upper end of said cylindrical chamber and adjacent said annular seat, and said elongate stem extending through said connecting passage and protruding within said cup;
(C) an insert cup comprising;
 (1) a tubular portion having a substantially constant circular outer diameter and a substantially constant circular inner diameter, said outer diameter being approximate to the inner diameter of said cylindrical chamber, said tubular portion having an upper end and a lower end, said upper end defining an upwardly directed mouth; and
 (2) a floor portion in the lower end of said tubular portion, said floor portion defining a insert cup inlet opening, said floor portion also defining a second annular seat about said insert cup inlet opening,
 said insert cup adapted to be inserted into said cylindrical chamber such that the longitudinal axis of said tubular portion is substantially common to said first axis, such that said tubular portion is substantially within said cylindrical chamber, and said mouth of said insert cup is directed toward said connecting passage;
(D) an inlet cleaning member comprising:
 (1) an inlet cleaning member stem extending from within said insert cup and through said second annular seat and also through said insert cup inlet opening, and
 (2) an inlet cleaning member head rigidly affixed to said stem member and having a longitudinal axis substantially common to said first axis;
(E) a compression spring having an upper and a lower end, said compression spring positioned within said cylindrical chamber and at least partially within said insert cup, said lower end biasing against said inlet cleaning member head, and said upper end biasing against said sealing member such that said sealing member is biased against said first annular seat and fluid flow may be restricted through said connecting passage, and such that said inlet cleaning member head is biased against said second annular seat, and such that said inlet cleaning member is agitated relative to said second annular seat responsive to a water pressure differential between fluid in said chamber and fluid in said inlet passage when said valve member head is unseated from said first annular seat;
(F) quick disconnect means comprising biasing means for biasing said second annular seat of said body member against a corresponding seat of an outlet port of a fluid supply source such that fluid may be directed under pressure to said insert cup inlet opening.

* * * * *